June 17, 1969  G. T. RANDOL  3,451,051
FLUID-LEVEL INDICATOR FOR MASTER BRAKE CYLINDERS
Filed Oct. 20, 1965
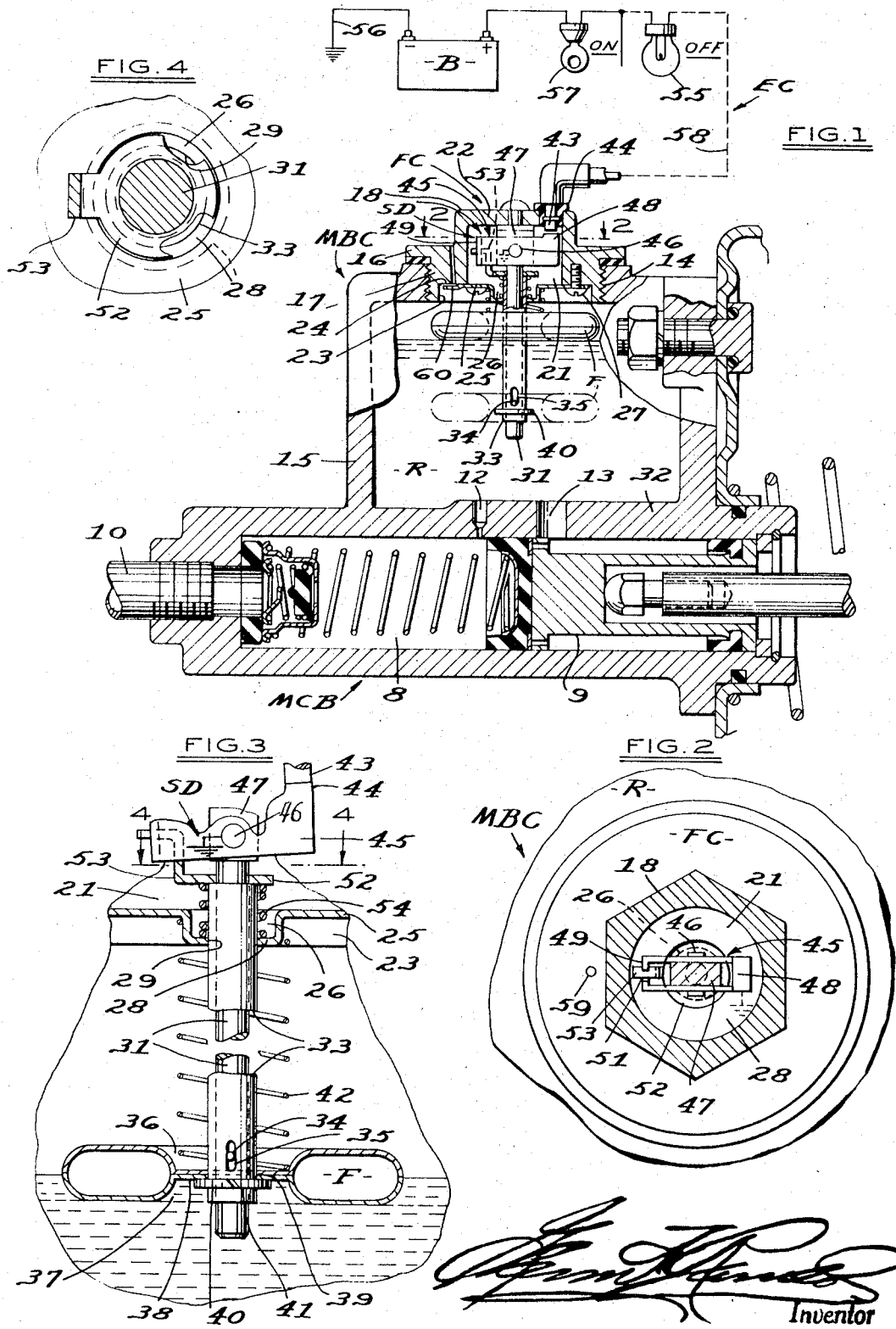
Inventor

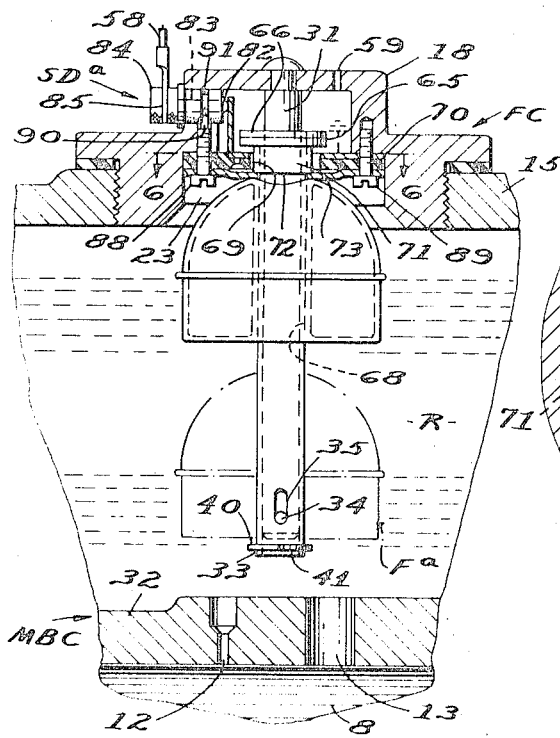
FIG. 5
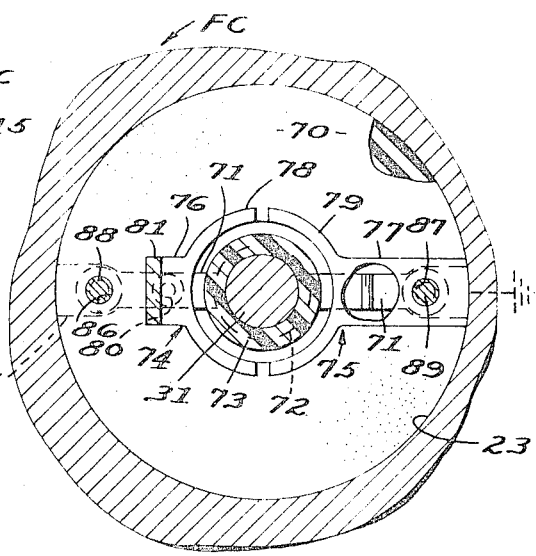
FIG. 6
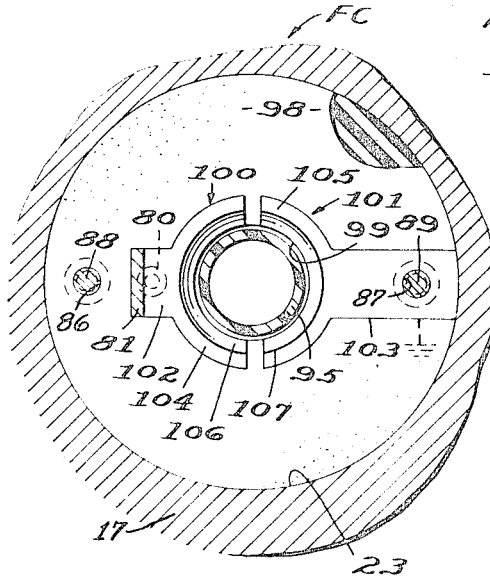
FIG. 8
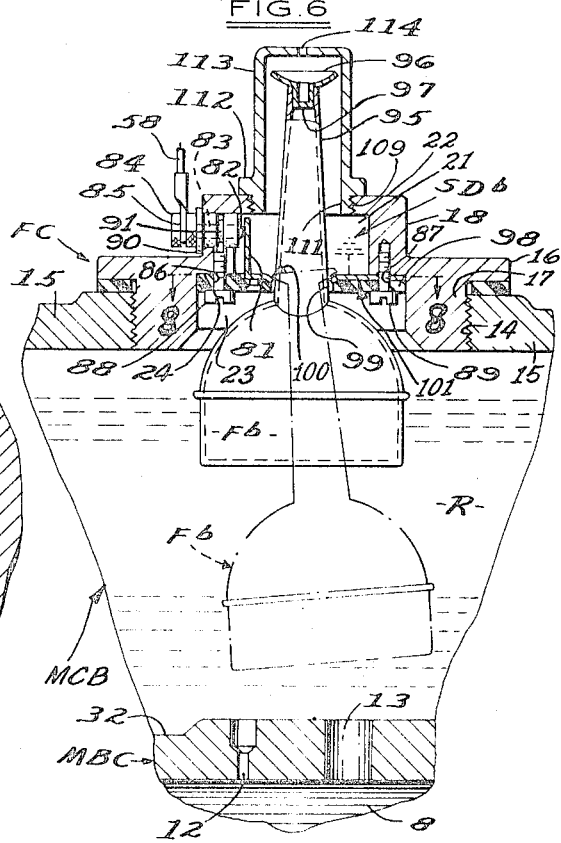
FIG. 7

United States Patent Office 3,451,051
Patented June 17, 1969

3,451,051
FLUID-LEVEL INDICATOR FOR MASTER
BRAKE CYLINDERS
Glenn T. Randol, P.O. Box 275, Mountain
Lake Park, Md. 21550
Filed Oct. 20, 1965, Ser. No. 498,329
Int. Cl. G08b 21/00
U.S. Cl. 340—244                                                    11 Claims

ABSTRACT OF THE DISCLOSURE

An apparatus for signalling the level of fluid in the supply reservoir of a master brake cylinder, which includes a fluid and spring controlled float for automatically controlling a switch in an electric circuit to energize and de-energize a signal device (warning light) in accordance with the level of fluid in said reservoir.

---

This invention relates generally to fluid-level indicating devices, and more particularly to a novel and improved fluid-level indicator for signalling an unsafe low-level status of the brake-fluid in the supply reservoir of the conventional master brake cylinder operably related with hydraulic brake systems used on motor vehicles and the like.

Motor vehicle owners and/or drivers usually rely on service station checking of the fluid level in the master brake cylinder when the braking system is serviced at non-regular intervals and thus the quantity of brake-fluid in the master cylinder reservoir is ignored during routine filling of the gas tank, checking water level in the radiator and battery and cleaning the windshield, such failure to check the brake-fluid level during such routine servicing can result in partial or complete loss of braking control on the road leading to accidents involving property damage and/or bodily injury or worse still loss of life.

The primary objective of the present invention is to overcome possible brake failures due to loss of brake-fluid from the supply reservoir by providing a brake-fluid level indicator which automatically signals the driver when an unsafe low-level status of the fluid exists so that the proper level can be restored for safety in braking operations.

Another object of the invention is to provide in said indicator, a signal device operable to produce visual or audible indications to the vehicle driver of the existence of an unduly dangerous level of brake-fluid so that the proper level can be restored, for example, at the next ahead service station, thus avoiding possible loss of braking control through continued use of the vehicle brakes with the brake-fluid critically low.

A more specific object of my invention resides in the provision of a novel switch mechanism (device) controllable by a float reciprocably disposed on a stem fixed at one end to the central portion of the inner side of the removable filler cap for conventional master cylinder reservoirs, and which is operably related with said switch device to selectively open and close the electrical contacts thereof as a function of float buoyancy within a predetermined safe range of fluid level and spring-bias in opposition to such buoyancy to open said contacts, and loss of buoyancy at a predetermined critical low level of fluid enabling the weight of the float supplemented by a different spring-bias to close said contacts, and thereby completing an energizable circuit to turn "on" a red warning light, or optionally, a buzzer to signal the driver that the brake-fluid level has reached an unsafe low point, said contacts when open being effective to interrupt said circuit to turn "off" said warning light to indicate to the driver that the fluid level is within a predetermined satisfactory range in the supply reservoir.

Another object is the provision of a baffle plate between the switch operating mechanism and reservoir fluid to prevent the latter from entering the chamber within which said mechanism is operably disposed to maintain the switch contacts dry for sensitized transmission of electrical current therebetween, and wherein the float for actuating in part said switch device remains substantially stabilized in its buoyant position notwithstanding the reservoir fluid is agitated causing undulation and splashing, and changes in angularity out of the horizontal when the vehicle is on an incline, for example.

A modified form of the invention provides for the elimination of lever-actuation of the switch device by said float mechanism, and wherein the movable switch contact is mounted directly on the sleeve for actuation by said float is a function of variations in fluid level within the supply reservoir, to open and close said switch device.

Another modified form of the invention features a pendulum-type float mechanism wherein the pivotal point thereof defines an arcuately formed switch contact having universal movement with respect to a pair of spaced fixed complemental switch contacts when the latter are bridged by the movable contact in response to a predetermined fluid level of the fluid in said supply reservoir, said movable contact in cooperation with said fixed contacts defining a switch device operable between open and closed positions by said float mechanism as a function of variations in the fluid level aforesaid, said float mechanism having a normal vertical position when the fluid is substantially calm, and radially displaceable out of said normal position under influence of fluid agitation without interrupting the closed position of said switch device when the fluid is at or below the aforesaid predetermined level.

Another object is to embody said switch device and actuating float mechanism therefor, in the conventional filler cap or cover for the filler opening of the reservoir to provide a simple and economical after-market accessory available at all service stations, car dealers, and automotive parts supply stores over the country and thereby promoting safe vehicle braking control nationwide by enabling drivers and/or car owners to maintain the brake system fully operative insofar as brake-fluid requirements are concerned.

Other and more specific objects, features, and advantages of the present invention will become apparent to persons skilled in the related art, in the course of the following detailed description wherein reference is had to the accompanying drawing exhibiting for illustrative purposes only a preferred and two modified embodiments, in which:

FIGURE 1 is a longitudinal-vertical sectional view of the conventional master brake cylinder showing my novel brake-fluid level indicator embodied in the removable filler cap for the fluid supply reservoir, and wherein the warning light is "off" to visually indicate a satisfactory level of brake-fluid;

FIGURE 2 is a transverse section taken on an enlarged scale along the line 2—2 of FIGURE 1 and showing particulars of the movable switch contact element and pivotal connections with the filler cap and actuating sleeve, respectively;

FIGURE 3 is a fragmentary view of FIGURE 1 on an enlarged scale showing the switch device in closed-contact condition and the warning light "on" to signal the driver that the brake-fluid is at or below an unsafe point;

FIGURE 4 is a plan view partly in section taken on an enlarged scale along the line 4—4 of FIGURE 3 and showing the two pivotal connections of the movable contact element;

FIGURE 5 is a modified form of the switch device in which lever-actuation of the movable contact element is eliminated;

FIGURE 6 is a plan view partly in section taken on an enlarged scale along the line 6—6 of FIGURE 5 to clarify the structural details of the stationary switch contacts;

FIGURE 7 is another modification wherein a pendulum-type float mechanism is characterized by a concave movable contact element defining the pivotal point of said mechanism, said movable contact being adapted to cooperate with a pair of spaced fixed contacts to bridge and unbridge the latter in response to variations in fluid level effecting buoyancy of said float mechanism, said fixed contacts being maintained in bridging relationship irrespective of radial displacement of the float mechanism out of its normal vertical position as a function of the brake-fluid when agitated; and FIGURE 8 is a plan view partly in section taken on an enlarged scale along the line 8—8 of FIGURE 7 to clarify structural details of the stationary switch contacts.

Referring now to the drawing wherein like reference characters designate similar and corresponding parts throughout the several views, and more particularly to FIGURES 1 and 2 in which I have disclosed the conventional pedal-operated master brake cylinder generally designated MBC comprising a fluid-working cylinder 8, a piston assembly 9 reciprocably disposed in said cylinder to pressurize the fluid and displace the same through a discharge conduit 10 connected to a plurality of wheel cylinders (not shown) to apply and release the vehicle brakes (not shown), a fluid supply reservoir R adapted for gravitational fluid feed into said cylinder via a compensating port 12 when said piston is fully retracted as shown in FIGURE 1, and an intake port 13 between said reservoir, and piston, a threaded filler opening 14 through the top wall of the reservoir body 15, and a removable filler cap FC for closing said opening 14 and for draining or replenishment of the brake-fluid as required.

The aforesaid filler cap incorporates my invention and comprises an exterior annular flange 16, a reduced diameter externally threaded depending ring-like flange 17, a hollow coaxial exterior embossment (dome) 18 preferably in hexagonal profile for reception of a suitable wrench for manual removal and installation of said cap from said opening 14, said fluid supply reservoir R being mounted integrally atop the master cylinder body generally designated MCB. The hollow within the dome 18 defines a cylindrical switch chamber 21 closed at its upper end by an integral wall 22, and which opens into a counterbore 23 communicating with the interior of said reservoir. Juncture of said chamber and counterbore produces an annular shoulder 24 for mounting the peripheral margin of a circular divider plate (baffle) 25 having a central circular concavity (depression) 26, as by cap screws 27. The aforesaid concavity is cup-shaped with a bottom wall 28 centrally apertured at 29. Depending from the central interior of said chamber and wall 22 is a float support and guide stem 31 with its upper end fast on said wall as shown. This support stem extends downwardly into the reservoir with its free end in spaced relation with respect to the bottom wall 32 of said reservoir.

Slidably disposed on said support stem 31 is an elongated switch-actuating member (sleeve) 33 which is connected to said stem by means of a lost-motion (pin-and-slot) connection 34, 35, respectively, to define the relative sliding movement of said sleeve in an upward direction only for operating said switch device SD to open-contact condition, the downward movement of said sleeve being defined by closed-contact condition of the switch device as will appear. The aforesaid acuating sleeve 33 loosely projects through said central aperture 29 in said concavity bottom wall, with its lower end normally extending substantially flush with the free lower end of said support stem as shown in FIGURE 1.

Reciprocably disposed on said actuating sleeve is a hollow biscuit-like float generally designated F preferably of molded plastic material to provide a high degree of buoyancy. The central portions on opposite sides of said float are formed with opposing circular concavities 36, 37 separated by an interposed wall 38 provided with a central circular apreture 39 through which the aforesaid actuating sleeve passes. In the normal upper position of said float as shown in FIGURES 1 and 2, the brake-fluid in the reservoir R is considered at a satisfactory level, that is, the reservoir is full, but when the float occupies its abnormally low position as shown in FIGURE 3 and by dashed lines in FIGURE 1, the brake-fluid is considered at a dangerously unsafe level for safety in vehicular braking control and, therefore, the reservoir should be filled to normal factory-specified level of one-half inch from top. When the float occupies its abnormal position aforesaid, the lower peripheral margin defining the aperture 39 is in engagement with an abutment disclosed herein as a split-type thrust ring 40 mounted in a complemental annular groove 41 formed in the actuating sleeve adjacent its lower end to produce a "one-way connection" between the float and said sleeve as shown, and thereby enabling the float F upon losing a portion of its buoyancy to act on said sleeve to move the same downwardly to close a switch device generally designated SD, said guide-stem 31, actuating sleeve 33 and included lost-motion connection 34, 35 and thrust ring 40 coact to produce what may be termed a "switch-actuating mechanism."

To supplement the weight of said float F, a delicately compressed spring 42 operably encircles that portion of the actuating sleeve between said float and the bottom wall 28 of said concavity 26, to react between said concavity wall and interposed wall 38 of said float to urge the latter downwardly as a supplemental biasing force to the weight of said float under gravity in opposition to its degree of buoyancy, to insure actuation of said sleeve 33 as well as providing a stabilizing force on said float upon reaching its abnormally low position aforesaid.

The aforesaid switch device SD comprises a fixed electrically conductive terminal post 43 provided with a contact (point) 44 on its inner end, and which extends through an insulative bushing pressfitted or otherwise secured in a hole through the switch chamber wall 22, into the interior of said chamber 21 as shown. A grounded terminal defining a movable contact-carrying element 45 is provided on the chamber wall 22 and is pivotally connected intermediately at 46 in straddle-mounted relation to a flat portion 47 (see FIGURE 2) on said stem 31 adjacent the inner face of said chamber wall 22. A contact (point) 48 defines one end of said movable element 45 for selectively disengaging from and engaging with the aforesaid fixed contact 44 to open and close said switch device SD as is understood. The opposite end portion of the movable element 45 is formed with an end segment 49 provided with a horizontal slot 51. The upper end portion of the aforesaid switch-actuating sleeve 33 is fitted with an annular outstanding flange 52 having an offset portion 53 adapted to engage the aforesaid slot 51 to produce a pivotal connection between said movable element 45 and said sleeve 33 whereby reciprocable movements of the latter are converted into rocking movements of said element 45 to open and close said switch device SD.

Another delicately compressed spring 54 is operably disposed in said concavity 26 to react between the bottom wall 28 and the underside of said sleeve flange 52. The relative strengths of the springs 42 and 54 require precision relative calibration so that reaction of spring 54 is sufficient to lift the actuating sleeve 33 to open the switch contacts 44, 48 when the float F occupies any position above abnormally low position aforesaid, but upon said float reaching its abnormally low position and thereby lowering the aforesaid actuating sleeve 33 to the position of FIGURE 3, loss of a portion of its buoyancy plus the biasing effect of said spring 42 should be so capacitated as to overcome spring 54 and thus close the switch contacts 44, 48 to complete the circuit to an energizable indicating (signalling) device herein disclosed in the form of a warning light 55 to provide the driver with an awareness that the fluid in the master cylinder reservoir R has dropped to an unsatisfactory low level and should be refilled without delay, and that the cause of such excessive loss of fluid should without fail be ascertained and corrected before driving of the vehicle is resumed.

An electric circuit EC shown in FIGURE 1 comprises a battery B having a grounded terminal 56, the ignition switch 57 and aforesaid warning light 55 in series with the switch device SD. Turning the ignition swtch "on" completes the circuit to the ignition system for the vehicle engine (not shown), and also conditions the warning light 55 which has one side connected to a conductor 58 which in turn is detachably connected to the fixed terminal post 43, to turn "on" (red) upon fluid level dropping to an abnormally low point as shown in FIGURE 3. As long as the fluid level is above such abnormal point, the float F is disengaged from the thrust ring 40 on the switch actuating sleeve 33 to enable the spring 54 to lift said sleeve to the position of FIGURES 1 and 2 wherein the contact 48 on the movable switch element 45 is disengaged (separated) from the fixed contact 43 to interrupt the circuit EC thus turning the warning light 55 "off" to serve as visual evidence that the fluid level in the reservoir R is at a satisfactory safe level.

An air-vent hole (port) 59 through the chamber wall 22 maintains the interior of the reservoir R at atmospheric pressure via a depression 60 formed in the peripheral margin of the divider plate 25 best shown in FIGURE 1.

Incorporation of the switch device SD on the underside of the filler cap FC produces a unitary assembly for easy removal and installation with respect to the filler opening 14 for replenishing the brake-fluid as required, upon detaching the conductor 58 from the fixed terminal post 43 carried on the cap dome 18 as shown in FIGURE 1.

FIGURES 5 and 6 disclose a modified form of the switch device SD in which lever-actuation of the movable element 45 (main embodiment FIGURES 1–4), is eliminated in favor of an annular conductive element 65 bonded to the underside of an outstanding annular flange 66 formed atop said switch-actuating sleeve 33, said flange being made of insulative material integrated with said sleeve 33 with the latter projecting freely through coaxial openings 68, 69 in the hollow float F$^a$ and a fixed nonconductive circular disc 70, respectively, said disc constituting a substitute for the aforementioned divider plate 25. The switch-actuating sleeve 33 is slidably guided and supported on the aforesaid stem 31 similarly to the sleeve and stem mounting in the main embodiment. The bottom wall of said float F$^a$ defines the marginal portion of said opening 68 and is adapted to engage the aforementioned split-type thrust ring 40 carried in the sleeve groove 41 adjacent the lower end of said sleeve and upon the brake-fluid in the reservoir R reaching a low abnormal point as shown in FIGURE 5, the float F$^a$ is relieved of a portion if not all of its buoyancy to overcome a pair of diametrically opposed leaf-springs 71 contiguous to the underside of said disc, and which engage at their confronting free ends an annular shoulder 72 defining the juncture of an enlarged diameter portion 73 terminating the upper end of said sleeve and on which the aforesaid flange 66 is formed as shown, to move the sleeve and connected element 66 downwardly into bridging relationship with respect to a pair of fixed conductive elements 74, 75, the latter element serving as the ground for the switch device SD$^a$, and thereby energizing the electric circuit EC to turn the warning light 55 "on" (red) as a visual indication to the driver that the brake-fluid in the reservoir R is at a low unsafe level and thus requires replenishment if the vehicle is to be further operated safely insofar as braking control is concerned. The relative reciprocable operating movement of the switch-actuating sleeve 33 with respect to the guide-support stem 31 is defined by the aforesaid pin-and-slot connection 34, 35 to establish the switch device SD$^a$ in open-contact condition, while engagement of the contacts 65, 74–75 defines the closed-contact condition of said switch device.

The pair of fixed elements 74, 75 is characterized by horizontal segments 76, 77, respectively, the latter segment having a ground connection with the conductive shoulder 24 aforesaid. These two segments terminate at their inner ends in spaced arcuate segments 78, 79, respectively, as shown in FIGURE 6. The horizontal segments are inlaid in corresponding surface recesses, respectively, formed in the upper face of the disc 70, and a rivet 80 insures stabilization of the element 74 which includes an upstanding springy conductive terminal 81 adapted to bear at its upper end against the inner end 82 of a horizontally disposed conductive terminal post 83 fixed in an insulative bushing interfitting a hole through the vertical wall of the cap dome 18, the outer end of said terminal post being provided with a knurled and medially grooved head 84 for reception of a detachable split terminal 85 defining one end of the aforementioned conductor 58.

The pair of leaf-springs 71 and the disc 70 are provided with a pair of registering diametrically opposed holes 86, 87 with the latter hole coaxial with a hole through the outer end of the horizontal segment of the fixed element 75 whereby a long and a short cap screw 88, 89, respectively, pass through said holes as shown into threaded engagement with aligned holes processed in the aforementioned shoulder 24 to mount the disc 70, and the leaf-springs 71 on the underside of said disc, as shown in FIGURE 5. The upper end portion of the long cap screw 88 terminates in a smooth reduced diameter extension 90 which engages an external annular groove 91 formed in the medial portion of said insulative sleeve to stabilize te latter in its normally installed disposition shown in FIGURE 5.

The hollow float F$^a$ is slidably disposed on the switch-actuating sleeve 33, and both are preferably made of non-conductive material such as molded rubber or plastic. The movable switch element 65 is adapted to bridge and unbridge the contact portions 78, 79 of the fixed elements 74, 75, respectively, and thereby completing and interrupting, respectively, the connected electric circuit EC in which said warning light 55 is interposed in series, such actuation of the movable element 65 being effected by the float F$^a$ under gravity upon loss of a major portion of its buoyancy thus overcoming the leaf-springs 71 as the level of the brake-fluid in the reservoir drops to a low unsafe point. The springs 71 are so rated as to lift the switch-actuating sleeve 33 upon disengagement of the float F$^a$ from the thrust ring 40, and thereby moving the switch element 65 up to unbridge the contact portions 78, 79 to interrupt the circuit EC to the warning light 55 to turn it "off" as an indication (signal) to the driver that the brake-fluid in the reservoir R is at or above a safe point as shown in FIGURE 5.

Upon restoring the fluid level in the reservoir R to its proper level of approximately one-half inch from the top, the float F$^a$ upon replacing the filler cap FC assumes its topmost position as shown in solid lines in FIGURE 5 wherein the float is disengaged from the thrust ring 40 thus releasing the springs 71 to lift the switch-actuating sleeve 33 to disengage the movable element 65 from the spaced fixed contact portions 78, 79 to interrupt the electric circuit with consequent turning "off" of the warning light 55 for visual indication to the driver that the brake-fluid is at a satisfactory safe level.

FIGURES 7 and 8 disclose another modified form of the switch device SD wherein the hollow float F$^b$ and switch-actuating sleeve 33 are formed of non-conductive rubber or plastic material to produce a unitary pendulum-type switch assembly, and thereby eliminating the aforesaid support stem 31 and sleeve 33 slidable thereon as disclosed in FIGURES 1 and 5.

The upper end of the hollow sleeve (stem) portion 95 of the float F^b is fitted with a concave switch contact 96 having a depending cup-shaped extension 97 press-fitted or otherwise fixed atop the hollow in said stem portion 95 as shown, to move as a unit.

A disc 98 similar to the disc 70 in FIGURE 6 is mounted on the annular shoulder 24 and provided with a central aperture 99 through which the upper portion of the stem portion 95 passes, said disc 98 having a pair of fixed contact elements 100, 101 (see FIGURE 8) characterized by horizontal segments 102, 103 which terminate at their respective inner confronting end portions in spaced arcuate contact portions 104, 105 which terminate in spaced tapering portions 106, 107 in cross section, inlaid in recesses correspondingly shaped, respectively, formed in the upper face of said last-defined disc, the inner perimeter of the latter defining the aforesaid aperture 99 as shown. The outer end portion of the segment 102 is provided with the aforesaid upstanding conductive springy element 81 having its upper end in engagement with the inner end 82 of the aforementioned fixed terminal post 83 pressfitted or otherwise secured in the insulative bushing projecting through the hole in the vertical wall of the cap dome 18 (see FIGURE 7).

The one end of the conductor 58 is detachably connected to the head 84 on the outer end of the terminal post 83 in a manner similar to the FIGURE 5 disclosure, and the outer end portion of the horizontal segment 103 engages the conductive annular shoulder 24 to provide the aforesaid ground for the switch device SD^b.

The aforesaid movable contact 96 is adapted to have universal movement with respect to said tapering contact portions 106, 107, to bridge said fixed contacts and thereby completing the electric circuit EC to the warning light 55 to turn it "on" (red) in response to the fluid level in the reservoir R reaching an abnormally low point as shown in FIGURE 7, thus providing the driver with visible indication that the brake-fluid should be replenished and the braking system generally inspected to ascertain cause of such excessive fluid loss before car operation is resumed.

It is important to note that the swivel movement between the concave contact 96 and cooperating fixed tapering portions 106, 107, enables the float F^b to have radial displacement about the axis of its normal vertical position of FIGURE 7 as shown by dashed lines in this figure without interrupting the bridging relationship of the fixed contact portions 106, 107, since irrespective of the degree swing of the float F^b out of vertical, the pivotal contact connection between the fixed tapering portions and the contact 96 maintains the switch device SD^b closed upon fluid level reaching such low unsafe point as a function of the float F^b lowering to the dashed line position shown in FIGURE 7, such radial displacement of the float F^b being caused by agitation of the brake-fluid in the reservoir R as is understood.

The central portion of the switch chamber wall 22 is provided with a threaded hole 109 which receives the threaded portion 111 of an annular flange 112 adapted to engage the upper confronting face portion on said wall 22, said flange and threaded portion 111 defining the lower open end of an elongated hollow housing 113 closed at its upper end and in which said concave switch element 96 moves into and out of engagement with its cooperating contact portions 106, 107 fixed to the aforesaid insulative disc 98. The closed end of this housing is provided with a center vent hole 114 to maintain the interior of the switch chamber 21 and reservoir R at atmospheric pressure level.

It is important to observe that the unitary construction of the float F^b and connected pendulum stem 95 provides a simple and economical means for closing and opening the switch device SD^b, and wherein spring-actuation in part as employed in FIGURES 1 and 5 embodiments of the movable switch elements, is eliminated in favor of uitlizing loss of buoyancy by the float F^b to apply its weight under gravity to bring the pivotal contact 96 into engagement with its cooperating fixed contact portions 106, 107 to close the switch device SD^b whereby the latter remains closed irrespective of swinging movement of the float under influence of the brake-fluid in the reservoir being agitated, that is, angulating out of its normal vertical position, while changes in the fluid level are effective to raise and lower the float F^b accurately for a true reading by the signal light 55 upon closure (bridging) of the fixed contact portions 106, 107 as is understood.

*Operational summary*

Operation of my novel fluid-level indicator for master brake cylinders, is believed manifest from the foregoing description and structural representations of the same; however, in the interest of further clarification, a brief re-statement will be given particularly emphasizing certain advanced features and advantages provided by the present invention.

Assuming the switch device SD is open as shown in FIGURES 1 and 2 which is effective to break the electric circuit EC to turn "off" the signal light 55 mounted on the dash panel of the vehicle for unobstructed view by the driver. Under such circumstances, the signal light indicates to the driver that the fluid-level in the master cylinder reservoir R is at a satisfactory safe point. However, should the fluid drop to or below an unsafe level as shown in FIGURE 3, the float F becomes effective under gravity due to loss of buoyancy to close the switch contacts 44, 48 and thereby completing the circuit to turn "on" the signal light 55 by showing a red warning illumination either by the light bulb itself or a panel of red colored glass in front of the light bulb as is understood.

This novel arrangement for signalling the driver when the brake-fluid level is at or below an unsafe level is in sharp contrast to a signal mounted on the reservoir filler cap for open-hood observation which is commercialy available. Such a commercial cap indicator is only partially safe because it can be observed only when under-the-hood inspection is being made by a filling station attendant or mechanic as the case may be. The station attendant may observe that the indicator shows a safe-level of fluid, yet the driver may be only a few miles from his last stop after such inspection and hydraulic failure occurs such as, for example, a broken line or a cup in the master or wheel cylinder, resulting in immediate and rapid loss of brake-fluid. Under such circumstances the driver would have no warning prior to the reservoir emptying and could drive a considerable distance before a braking application would be made only to learn that he had no brake at all which could well result in complete loss of vehicle control and possible collision with another car driving ahead and suddenly slowing, or inability to negotiate a dangerous curve without braking causing the car to leave the road endangering both life and property.

It is thus seen that under-hood fluid-level indicators actually provide assurance only to the person inspecting the indicator while the hood is up, the driver on the road has no warning of any change in the fluid-level in the master brake cylinder which could operate to render car control ineffective and therefore out of his supervision completely.

The present invention not only enables the inspector whether a serviceman or the driver, to know at a glance the fluid-level status but also serves to warn by a signal light or sound during car operation of any radical change in the fluid-level induced by malfunctioning of the hydraulic brake system whether at the master cylinder or the wheel cylinder. The instant the signal light 55 on the instrument panel shows "red," the driver is aware that the fluid-level is below a proper operating level and therefore brings the car to a halt. Then he can proceed slowly to the nearest service station or garage for the trouble to be corrected.

The float-actuating mechanism for the switch device SD is so constructed and operatively related with the switch actuating sleeve 33, that the position of the float is automatically stabilized at any height (position) on said actuating sleeve notwithstanding angulation of the fluid out of its normal horizontal status in the reservoir occurs. This stabilization is a function of the central aperture 39 in the float F being slightly larger than the outer diameter of the actuating sleeve 33 which passes through it. Should the fluid become angulated as when on a steep hill, the high side of the fluid applied to the underside of the float produces a canting-action, and since the fluid on the opposite side of the float is no longer effective thereagainst, the canting-action on the float tends to bind it on the sleeve in its existent elevated position as a function of the added buoyancy effective on the high side of the fluid, thus preventing a false-reading from the switch device SD. Under such conditions, the float F is stabilized in its established position corresponding to normal horizontal status of the brake-fluid, and will not adjust from such position until the fluid becomes more normally level. This novel feature prevents erratic operation of the switch device to shuttle between open and closed positions due to abnormal disturbances in the level of the brake-fluid which results in the signal light 55 turning "off" and "on," which if occurred, would at times give the driver a false signal. Thus the driver is provided with a reliable signal system which indicates to a high degree of accuracy the true status of the brake-fluid level in the reservoir R.

When the fluid is substantially level in the reservoir R, the float F is sensitive to such level to turn the signal light 55 "on" only when such level has reached an unsafe low point, and not before.

The invention contemplates that the outer cylindrical surface on the switch-actuating sleeve 33 may be smooth as depicted herein or roughened as by means of a pattern of indentations or closely generated circular serrations to cooperate with the central aperture 39 in the float F to insure the aforesaid stabilization of the latter in the position corresponding to substantially the existent level status of the fluid in the reservoir, notwithstanding the fluid may angulate when the vehicle is on an incline, or disturbed otherwise causing undulation or splashing as by vibration of the car. Moreover, an energizable electric buzzer may be substituted in the electric circuit EC for the signal light 55, to produce an audible warning to the driver when the brake-fluid reaches a dangerously low level.

The two modifications shown in FIGURES 5 and 7, respectively, disclose novel and commercial aspects of the present invention wherein the rockable contact element 45 of the main embodiment is eliminated in favor of directly mounting such contact atop the switch-actuating sleeve 33 (see FIGURE 5) which simplifies the construction therefore more economical; and in FIGURE 7 there is disclosed a pendulum-type movable contact element in lieu of the aforementioned rockable switch element 45, and in which the pivotal upper end defines an arcuate contact element cooperable with a pair of fixed tapering contacts in spaced relationship to produce a dish-like configuration. The lower end of the pendulum element is provided with the float $F^b$ to serve as the weight whereby agitation of the brake-fluid in the reservoir R moves the float correspondingly without disturbing the closed-contact relationship at the pivotal contact point of the pendulum action. This latter modification provides an extremely simple and economical mode of applying the present invention. It is important to note that the the pair of fixed contacts may be constructed with straight or curving tapering surfaces in cross section, and that in both modifications the horizontal segments are inlaid in complemental recesses formed in the upper surface of the insulative disc 70 or 98 with their upper sides flush as shown in FIGURES 6 and 8, respectively.

Having thus described my invention, I claim:

1. A fluid-level indicator for use with a master brake cylinder in operative association with the fluid supply reservoir therefor having a filler port closed by a removable chamber-defining filler cap, comprising: a switch chamber in said cap closed at one end and opening at the other end into said reservoir; a fixed insulative plate associated with the open end of said switch chamber; a central aperture through said plate; a pair of spaced fixed contacts mounted in said switch chamber; a support stem fast to the central portion of the closed end of said switch chamber and depending therefrom into said reservoir; a tubular switch-actuating member reciprocably disposed on said support stem and projecting through said aperture into said reservoir; a switch contact defining that end of said tubular member in said switch chamber, and which is adapted to selectively bridge and unbridge said pair of contacts; an annular float defining a central opening through which said tubular member passes; an operative connection between said tubular member and float enabling the latter to actuate the former in one direction only upon substantial loss of float buoyancy to bridge said pair of contacts; a normally compressed spring reacting between said divider plate and tubular member for moving said switch contact to unbridge said pair of contacts upon full buoyancy being restored to said float; an energizable electric circuit including energizing means therefor and in which said pair of contacts and an energizable indicating device are interposed in series to produce a physically discernible signal upon completion of said circuit in response to substantial loss of float buoyancy due to an abnormally low level of fluid in said reservoir; and a lost-motion connection operably incorporated between said stem and tubular member to limit relative rectilinear movement of the latter in the opposite direction only to unbridge said pair of contacts.

2. A fluid-level indicator for a master brake cylinder reservoir characterized by a filler port and a removable filler cap for closing said port, comprising: a switch chamber having a closed end in said cap; a support stem fast at one end to the central portion of the closed end of said switch chamber; a divider plate between said switch chamber and the interior of said reservoir; a central opening in said plate; a switch-actuating tubular member slidably supported on said support stem, and projecting from said switch chamber through said aperture into said reservoir; a lost-motion connection operably incorporated between said stem and tubular member and which defines the relative operating movement of said sleeve in one direction; a float slidably disposed on said tubular member; a thrust element carried by said tubular member adjacent its lower end and which is engageable by the confronting underside portion of said float to move as a unit downwardly in response to substantial loss of float buoyancy; a normally compressed spring encircling that portion of said tubular member between said float and said divider plate, and which is adapted to react therebetween to bias said float downwardly in opposition to float buoyancy; an annular outstanding flange defining the switch end portion of said tubular member; a radial projection defines the periphery of said outstanding flange and which is formed with an upwardly offset horizontal portion defining its outer end; a fixed terminal post having a conductive contact insulatively mounted through the closed end of said switch chamber; a rockable contact element pivotally mounted intermediately on that portion of said stem projecting into said switch chamber, and having a conductive contact at one end selectively engageable with and disengageable from said fixed contact; a slot in the outer end of said last-defined element and into which the offset portion of said radial projection projects to pivotally interconnect said tubular member and rockable contact element whereby reciprocable movements of said tubular member are converted into rocking movements of said rockable contact element which is grounded; an energizable electric circuit including means for energizing the same; and a warning light in series in said circuit with said rockable and fixed contacts adapted to signal an abronmally low level of fluid in said reservoir when turned "on" in response to corresponding movement of said float as a function of substantial loss of its buoyancy supplemented by the bias of said spring; and another normally compressed spring encircling that portion of the aforesaid tubular member above said divider plate to react between the outstanding flange aforesaid and said divider plate to lift said tubular member in cooperation with restortation of float buoyancy effective to overcome said first-defined spring and thereby rocking said rockable contact element to disengage its contact from said fixed contact to interrupt said circuit accompanied by turning "off" of said warning light to signal that the fluid level in said reservoir is at a satisfactory safe level.

3. A float-actuated fluid level indicator for master brake cylinder reservoirs characterized by a filler opening and a removable filler cap for closing said opening, comprising: a switch device incorporated in said filler cap and having a pair of spaced fixed contacts and a tubular rectilinearly movable contact element for selectively bridging and unbridging said pair of contacts, projecting into said reservoir; an annular float movable relatively to and as a unit with said movable contact element; an elongated guide element fast at one end to the innerside of said filler cap and projecting through said tubular contact element into said reservoir for controlling said rectilinear movement of said movable element; a lost-motion connection operably incorporated between said guide element and said tubular contact element for defining the limit of relative rectilinear movement of said movable element to unbridge said pair of contacts; an indicating device energizable for producing a physically discernible signal; and an energizable electric circuit including energizing means therefor for energizing said indicating device upon said movable contact element bridging said pair of contacts to complete said circuit in response to lowering of said float in accordance with an abnormally low level of fluid in said reservoir.

4. An electric signalling device comprising a metallic walled enclosure closed at one end and open at the other; a switch chamber defined by said enclosure; a hole through said walled enclosure; a bushing of insulative material fixed in said hole; an electrical conductive terminal post passing through said bushing; a stationary contact on the inner end of said terminal post; a contact lever pivoted intermediately its ends on a crosspin carried by a guide stem fast at one end on the closed end of said walled enclosure, said lever being disposed substantially normal to said stationary contact with one end defining a movable electrically conductive contact coperable with said stationary contact to selectively engage and disengage therewith; a switch-actuating tubular member reciprocably disposed on said guide stem for limited reciprocative movements; a lost-motion connection operably incorporated between said guide stem and said tubular member for predeterminately establishing the limit of relative reciprocable movement of the latter to disengage said movable contact from said stationary contact; a pivtal connection between the other end of said contact lever and end of said tubular member fast on the closed end of said walled enclosure whereby reciprocable movements of said tubular member are converted into rocking movements of said contact lever to engage and disengage said movable contact with and from said stationary contact; a centrally apertured float member slidably disposed on said tubular member to actuate the same in one direction as a function of loss of buoyancy; a normally compressed spring reacting between said tubular member and a fixed portion on said walled enclosure for actuating said tubular member in the opposite direction upon buoyancy of said float being substantially restored; and a liquid cavity associated with said switch chamber in which said float is operative to automatically signal via closed-contact condition of said device minimal level of said liquid.

5. In combination, a master brake cylinder for actuating hydraulic brakes having a fluid supply chamber; a filler opening in the upper side of said chamber; a dome provided with a blind axial bore adapted to detachably close said opening, said axial bore communicating with said chamber; a divider plate between said chamber and said axial bore and having a central aperture; a guide stem fixedly depending coaxially from the blind end of said axial bore through said aperture into said chamber; a contact-actuating sleeve reciprocably supported on said guide stem and loosely projecting through said aperture; a lost-motion connection operably incorporated between said guide stem and said sleeve to predetermine the limit of relative reciprocating movement of said sleeve with respect to said guide stem; a hole in said dome; an insulative bushing secured in said hole; an electrically conductive terminal post projecting through said bushing and having a stationary contact on its inner end; a grounded switch element movably mounted in said axial bore and having a contact engageable with said stationary contact; a compressed spring for disengaging said movable contact from said stationary contact; an operative connection operably incorporated between said sleeve and switch element enabling the latter to move the former simultaneously; an electric circuit including in series an energizable signal device, said switch element, said terminal post and means for energizing said circuit, said stationary and movable contacts producing a switch device in said circuit; an annular float defining a central opening through which said sleeve passes; an abutment portion on said sleeve engageable by said float to lower said sleeve in accordance with the movement required to engage said movable contact with said stationary contact upon a predetermined loss of brake-fluid effective to correspondingly lower said float into engagement with said abutment portion to move said switch element to circuit completing position, said spring being effective to maintain said movable contact disengaged from said stationary contact in circuit-interrupting position, upon said float assuming an elevated position corresponding to said fluid being above said predetermined level of loss.

6. A fluid-level indicator for use with a master brake cylinder in operative association with the fluid supply reservoir therefor having a filler opening closed by a removable chamber-defining filler cap, comprising: a switch chamber in said cap closed at one end with its open end communicating with said reservoir; a divider plate fixed over the open end of said switch chamber to close the same; a central aperture through said divider plate; a fixed insulated conductive contact mounted in said switch chamber; a switch-actuating mechanism projecting from said switch chamber through said aperture into spaced relation with respect to the bottom of said reservoir, said mechanism including an elongated stem fixed at one end to the central portion of the closed end of said switch chamber for slidably supporting a switch-actuating sleeve, and a lost-motion connection characterized by a projection on said stem effective in cooperation with a slot in said sleeve for limiting the sliding movement of said sleeve relative to said stem in one direction only; a switch contact element movably disposed in said switch chamber under control of that end of said sleeve which projects into said switch chamber, said movable contact element being selectively engageable with and disengageable from said fixed contact; an annular float slidably mounted on said sleeve to move the latter in the opposite direction to effect engagement of said movable contact element with said fixed contact upon substantial loss of float buoyancy; a one-way mechanical connection between said float and the said sleeve for moving the latter as aforesaid; a normally compressed spring reacting between said divider plate and said sleeve for moving the latter in said one direction to disengage said movable contact element from said fixed contact upon substantial restoration of float buoyancy; an energizable electric circuit including in series energizing means therefor, said movable contact element, fixed contact, and a signalling device energizable to produce a discernible signal upon completion of said circuit in response to substantial loss of float buoyancy as a function of an abnormally low level of fluid in said reservoir and thereby enabling said float to move said sleeve in opposition to said spring in said opposite direction to engage said movable contact element with said fixed contact.

7. The fluid-level indicator constructed in accordance with claim 6 in which the aforesaid one-way mechanical connection is positioned between said float and said sleeve comprises; a split-type abutment ring carried in an annular groove formed adjacent the reservoir end of said sleeve, said abutment ring being engageable by said float to move said sleeve downwardly to engage said movable contact element with said fixed contact upon substantial loss of float buoyancy as a function of the fluid level in said reservoir being at or below an abnormally low point.

8. The fluid-level indicator constructed in accordance with claim 7 including another normally compressed spring adapted to react between said divider plate and said float to urge the latter in opposition to float buoyancy to produce a supplemental biasing force for rendering the float effective to actuate said sleeve in said one direction and to stabilize the aforesaid movable contact element and fixed contact in engaged condition.

9. The fluid-level indicator constructed in accordance with claim 8 in which said movable contact element is pivotally connected intermediately of a pair of extremes thereof adjacent the fixed end portion of said stem; and another pivotal connection is provided between one of said extremes and said sleeve whereby rectilinear movements of the latter are converted into rocking movements of said movable contact element, said other extreme defining a conductive contact selectively engageable and disengageable with respect to said fixed contact in response to rectilinear movements of said sleeve in opposite directions.

10. The fluid-level indicator constructed in accordance with claim 9 in which said signal device is an electric bulb capable of being turned "off" and "on" in response to disengagement and engagement, respectively, of said movable contact element and fixed contact.

11. The fluid-level indicator constructed in accordance with claim 8 in which said movable contact element comprises: an annular conductive element carried on an outstanding flange formed atop said sleeve; and another fixed contact spaced from the first-defined fixed contact is provided in said switch chamber to serve as a ground whereby rectilinear movement of said sleeve in said one direction is effective to move said annular conductive element as a unit into bridging relationship with respect to both of said fixed contacts to complete said circuit.

References Cited

UNITED STATES PATENTS

| | | | |
|---|---|---|---|
| 1,311,244 | 7/1919 | Pippin | 200—84 |
| 1,719,078 | 7/1929 | Papashvili | 200—84 |
| 2,571,378 | 10/1951 | Parisi | 340—246 |
| 2,781,432 | 2/1957 | Ferrara et al. | 200—84 |
| 2,824,187 | 2/1958 | Fanning | 340—59 XR |
| 2,973,415 | 2/1961 | Bryan | 200—84 |
| 2,684,414 | 7/1954 | Kilpatrick | 340—244 XR |
| 2,786,914 | 3/1957 | Storck et al. | 340—244 XR |

FOREIGN PATENTS 882,970   11/1961   Great Britain.

JOHN W. CALDWELL, *Primary Examiner.*

DANIEL K. MYER, *Assistant Examiner.*

U.S. Cl. X.R.

200—84; 340—52